United States Patent [19]

Takenaga

[11] Patent Number: 4,812,940
[45] Date of Patent: Mar. 14, 1989

[54] DICTATION DISPLAY FOR DISPLAYING PRESENT POSITION AND CUE MARK POSITION INFORMATION

[75] Inventor: Hideo Takenaga, Tokyo, Japan

[73] Assignee: Olympus Optical Co., Ltd., Japan

[21] Appl. No.: 62,868

[22] Filed: Jun. 16, 1987

[30] Foreign Application Priority Data

Jun. 20, 1986 [JP] Japan ................... 61-144241
Jun. 20, 1986 [JP] Japan ................... 61-144242
Jun. 20, 1986 [JP] Japan ................... 61-144243

[51] Int. Cl.⁴ ............... G11B 15/18; G11B 19/02; G11B 27/12
[52] U.S. Cl. .................. 360/137; 360/13; 360/69; 360/72.1; 360/74.4
[58] Field of Search ............ 377/18; 360/13, 69, 360/71, 72.1, 72.2, 72.3, 74.4, 137; 369/25, 27-29; 379/75; 340/252-254

[56] References Cited

U.S. PATENT DOCUMENTS 4,200,893  4/1980  Matison ................... 360/72.1
4,386,379  5/1983  Smith et al. ............. 360/72.3
4,398,279  8/1983  Titus et al. ............. 360/137 X
4,399,527  8/1983  Titus et al. ............. 369/28
4,410,923  10/1983  Patel ................... 360/137

FOREIGN PATENT DOCUMENTS 54-143220  11/1979  Japan .
55-52573   4/1980   Japan ................... 360/69
57-141084  9/1982   Japan ................... 360/137
58-41457   3/1983   Japan ................... 360/69
58-34634   8/1983   Japan .

Primary Examiner—John H. Wolff
Attorney, Agent, or Firm—Ostrolenk, Faber, Gerb & Soffen

[57] ABSTRACT

A display apparatus for a recording and/or playback device detects a pulse signal delivered from one of winding and supply reels of the device and a reference signal of an oral statement recorded on a recording medium. The display apparatus separately displays on respective display rows the present position of the recording medium while running from supply to winding reels and the position of the reference signal. The display rows are arranged such that a plurality of display segments correspond with a predetermined time interval. The relative position of the reference signal to the present position of the recording medium is thus accurately displayed even when the recording medium is on the way to its end. The display rows are shifted to higher resolution when the distance in time from the present position of the recording medium to the next reference signal recorded is less than a predetermined time.

13 Claims, 11 Drawing Sheets

DICTATION DISPLAY FOR DISPLAYING PRESENT POSITION AND CUE MARK POSITION INFORMATION

BACKGROUND OF THE INVENTION

The present invention relates to a display apparatus for a recording and/or playback device (e.g. an audio tape recorder) which displays the present position of a recording medium (e.g., the present position on the tape at which playback or recording is taking place) as it is running as well as the positions of mark signals (e.g., cue signals) recorded on the recording medium.

In known audio tape recorders, it is common to record cue signals which indicate the starting and ending positions of a dictated item (e.g., a letter) so as to be able to identify the location of a plurality of items recorded on the magnetic tape. This makes it possible to improve the efficiency of the typist by knowing the positions of each item recorded on the magnetic tape and the present point on the magnetic tape at which playback (transcription) is taking place.

One known method and apparatus for achieving this result is disclosed in Japanese Utility Model Publication No. Sho 58/1983-34634. In the disclosed apparatus the present position of the magnetic tape is calculated from the difference in the frequencies of respective pulses generated from the supply and winding reels of the tape as the tape is advanced or rewound (more generally transported) and the position of a cue signal is displayed. In this method, however, the need to detect pulses from the supply and winding reels makes it necessary to provide pulse generators and detectors, which complicates the apparatus and increases its cost.

Another display apparatus is disclosed in Japanese Laid Open Patent Publication No. Sho 54/1979. This apparatus displays cue signals by counting pulses from either of the supply and winding reels and the position of cue signals based on the counted value when a magnetic tape reaches its end. In this method, however, a magnetic tape must be rewound until it reaches its tape end in order to accurately display the relative position of a cue mark signal on the tape. This complicates the operation of the device and it is impossible to accurately provide the relative position of the cue signal while the magnetic tape is being rewound.

The display of the present position of the magnetic tape and the position of a cue signal recorded thereon can be accomplished by providing a display apparatus in which a plurality of light emitting diodes (LED) are arranged in two rows so as to give a visual readout of the positions of the cue signals and the present position of a magnetic tape.

In display apparatus of this kind, it is typical to arrange the intervals one minute apart so as to indicate a present position of a magnetic tape or positions or cue mark signals by lighting or blinking the LEDs corresponding to their positions.

With such an arrangement in which the distance between each LED indicates a period of about one minute, when a cue mark signal is displayed on the fifth LED beyond the LED indicating the present position of the magnetic tape, for example, it is possible to determine that the next cue signal is at a position approximately five minutes after the present position. According to this information, a typist can easily determine that the remaining portion of the item being typed is about five minutes long.

Since the distance between each LED is one minute, the resolution of the display is less than one minute. Accordingly, a display apparatus has been proposed, in which the number of LEDs is increased so as to provide an increased resolution. Alternatively another display apparatus having a high resolution can be added. In addition, a display apparatus has been disclosed in U.S. Pat. No. 4,410,923 in which a plurality of LEDs are arranged in two rows so as to be able to respectively display the present position of the magnetic tape and the position of the cue signal. A numerical display apparatus is also provided which numerically displays the time from the present position to the position of the next cue mark signal.

With such arrangement, since a time period from a present position of a magnetic tape to a position of a cue mark signal can be displayed in a second unit, it is possible to precisely read the residual time period to the next cue mark signal.

As described above, the prior art provides means to improve resolution in a time period for display by increasing the number of LEDs or providing another display apparatus or a numerical display apparatus having high resolution. Such prior art devices, however, make it necessary to provide an extra panel surface and complicates the prior art structure greatly. Accordingly, it is difficult to reduce the size and cost of the structure of the prior art.

OBJECTS AND SUMMARY OF THE INVENTION

It is an object of the present invention to overcome the above-described disadvantages of the prior art. To this end, the present invention provides a display apparatus for a recording and/or playback device which detects pulse signals from the supply reel shaft or the winding reel shaft are detected and displays the relative position of a specific mark signal as a function thereof while sharing a display row means between high and low resolution displays. Compared with the prior art, the display of the invention is simpler in structure, reduced in cost and improved in accuracy.

According to the present invention, the relative position of a specific mark signal can be forecasted even in the course of running of a magnetic tape and the display of the relative position of a mark signal is more accurate the closer the magnetic tape is to its beginning.

DETAILED DESCRIPTION OF THE PREFERRED EMBODIMENTS

Figure 1:
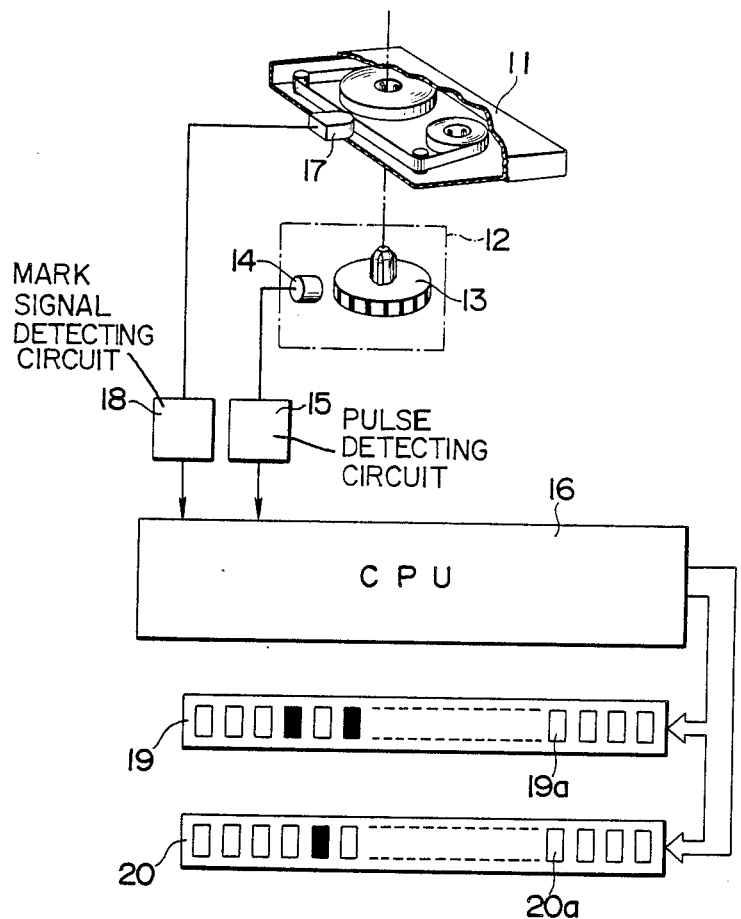
FIG. 1 is a schematic diagram showing a display apparatus of the present invention.

In FIG. 1, numeral 11 refers to a tape cassette which is loaded in a cassette chamber of a recording and/or playback device. A mechanism for driving either of the supply or winding reels of the tape cassette 11 is provided with a reel pulse detector 12 for producing a pulse signal in proportion to the number of revolutions of the driving reel. The reel pulse detector 12 comprises a disc 13 disposed on a rotary shaft of the reel driving mechanism. On the peripheral surface of disc 13 an alternate black and white pattern is formed. A photoelectric transducer 14 is disposed adjacent the peripheral edge surface of the disc 13 for generating a pulse signal by detecting light reflected by the black and white pattern on such surface. An electrical signal from the photoelectric transducer 14 is transformed to a pulse signal by a reel pulse detecting circuit 15 and then given applied to a central processing unit (CPU) 16 of a microcomputer.

A magnetic head 17 for a two channel recording and/or playback device, for example, is to record and reproduce oral statements, on a first track of a magnetic tape, and to record and reproduce a cue mark signal on a second track of the tape which indicates a start position of a dictated item. A cue mark signal recorded on the magnetic tape is read as an electric signal by the magnetic head 17 and applied to CPU 16 via a mark signal detecting circuit 18.

The CPU 16 processes pulse signals from the reel pulse detecting circuit 15 and cue mark signals from the mark signal detecting circuit 18 in accordance with a program which will be described later and the resulting data are stored in a random access memory (RAM), not shown. The data are delivered between the RAM and a read only memory (ROM), not shown. The position of the cue mark signal and the present position of a magnetic tape are displayed respectively on display row means 19, 20. Further, the CPU 16 is constructed such that, when cue mark signals are detected, the position of a mark signal is converted to a time value by a conversion means on the assumption that the present position of the magnetic tape is the beginning position of the tape (this will not usually be the case) and the results are repeatedly displayed on the display row for displaying a mark signal in the display means (19, 20) at a given time interval. As used herein, references to the beginning of the tape indicates the beginning of the tape during a playback operation when material recorded on the tape is played back and, typically, transcribed.

The display row means 19, 20 each include a plurality of display segments 19a, 20a arranged in a row for respectively displaying positions of cue mark signals and the present position of the magnetic tape. The display row means 19, 20 may employ a display apparatus comprising a plurality of display elements such as liquid crystal displays (LCD) and light emitting diodes (LED). In the preferred embodiment of the present invention, each row has thirty LEDs and each display segment 19a, 20a corresponds to a given time interval of one minute when a 30 minute tape is used and two minutes when a magnetic tape for sixty minutes is used.

Embodiments of software in the display apparatus having the structure described above will be described hereinafter.

Figure 2:
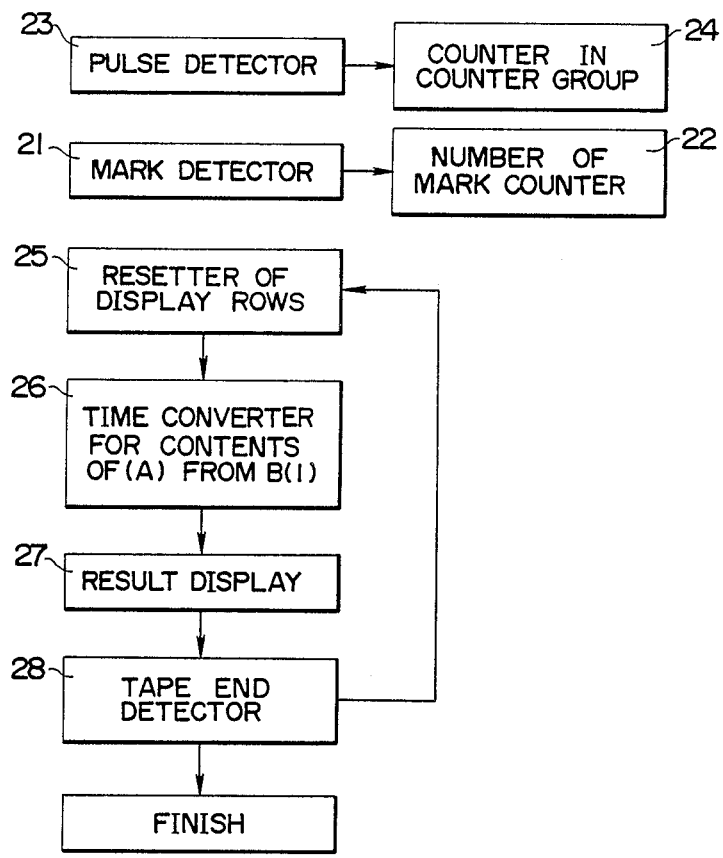
FIG. 2 is a functional block diagram showing a first embodiment of software in a display apparatus of the present invention.

In FIG. 2, which shows a first embodiment of software in the display apparatus of the present invention, each cue mark signal on a magnetic tape is detected by a mark detecting means 21 and the number of mark signals is counted by a counting means 22. Pulses generated from one of the supply and winding reel shafts (and indication of the present position of the tape) are detected by a pulse detecting means 23 and counted by one counter means out of a group of counter means 24. Each counter means (one or more related counters or their equivalent) corresponds to a single cue mark signal. As the cue mark signals are detected, the display row 19 which displays the cue mark signal positions is repeatedly reset by a reset means 25 and the contents of the group of counters 24 are repeatedly converted to a time value by a conversion means 26. The converted information (time value) is repeatedly displayed on a display means 27 as if the present position of the magnetic tape is the beginning of the tape actual beginning until the end of the magnetic tape is detected by a tape end detecting means 28. As such, during the scanning operation the relative position of the cue mark signals are constantly renewed and are revised and displayed to a more correct value as the scanning operation continues.

Figure 3A:
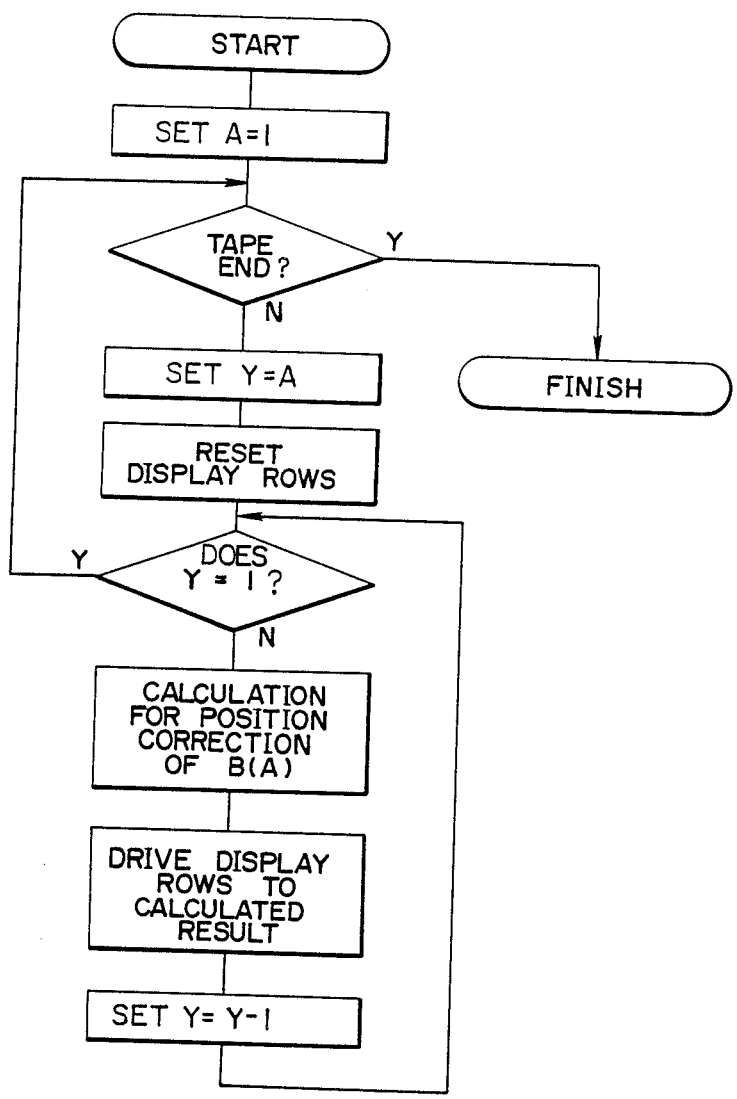
FIGS. 3a–3c are flow charts showing operations of a microcomputer in the first embodiment.
Figure 3B:
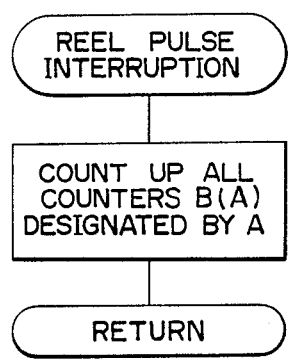
Figure 3C:
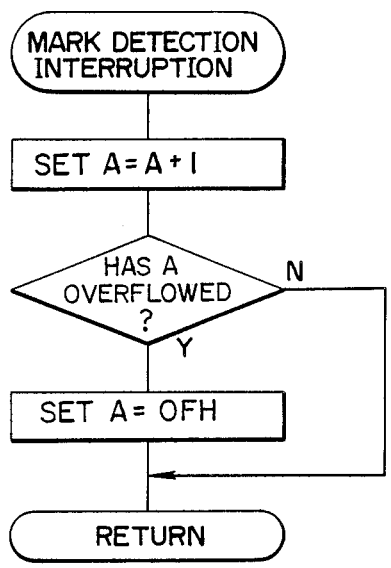
Figure 4:
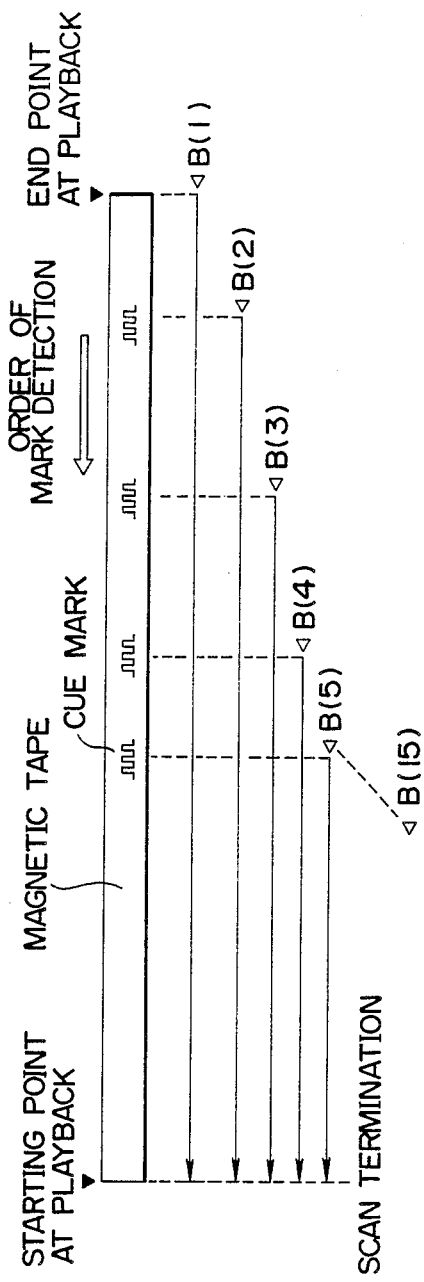
FIG. 4 is a diagram for explaining operations of a counter which is used in the first embodiment.

The operation of the CPU 16 will now be described with reference to FIGS. 3a-3c. When a tape cassette in which oral statements items have been recorded is loaded into a transcription playback device and rewound, a scanning operation takes place in which the cue mark signals are detected and the reel pulses are counted. When the scanning operation is initiated (rewinding begun), the address A in a memory is set equal to "1" (FIG. 3a). (The address A identifies the set of counters to which the reel pulses are to be applied and corresponds to the particular item on the tape identified by a particular cue mark signal.) If the magnetic tape is not at its end before playback, the numerical value in A is applied to a register Y and the display on the display row 19 is reset. During this time, whenever a cue mark signal is detected (see FIG. 3c), the numerical value in the address A increases by 1. When the address A overflows, for example by counting up to 16, it returns to 15. Similarly, when a reel pulse is detected (see FIG. 3b), all counters B (A) assigned by the address A count up as shown in FIGS. 3(b) and 4. This routine continues until the magnetic tape reaches its actual beginning.

Whenever a new cue mark signal is detected, a calculation for positional correction of counters B (A) assigned by the address A is effected to calculate the position of the cue mark signal from relative to the presumed beginning of the tape (i.e., the present position of the tape) and the calculated result is displayed on the display row 19. At this time, the count in register Y is reduced by 1 and the operation is resumed from the newest value.

According to this program, whenever a cue mark signal is detected, the address A increases by 1 and all counters B (A) assigned by the address A count up as a function of the reel pulses. Then, the position of a cue mark signal is converted to a time value as a function of the numeral value in the counters B (A) so as to indicate a more proper relative position of the cue mark position as the beginning position of the magnetic tape approaches.

Thus, even if the scanning operation starts in the middle of the magnetic tape, it is possible to display the relative position of a cue mark signals.

With the arrangement described above, the scanning operation can start from any position on a magnetic tape, so that there is no need to wind a cassette tape on which oral statements have been recorded to its end and the operation is conveniently simplified.

In addition, even when a magnetic tape does not reach its beginning, the relative position of a cue mark signal can be forecast with a transcription playback device as long as a cue mark signal is recorded at the end of an oral statement. This means that the length of the oral statement can be determined before the magnetic tape reaches its beginning, and a typing plan, for example, can be conveniently determined.

Further, pulses can be detected from either one of the supply and winding reels, so that it is possible to simplify the present structure and reduce its cost.

Still further, even when a magnetic tape does not reach its beginning it is possible to forecast the relative position of a cue mark signal and to determine the relative position of a cue mark signal more precisely the closer the magnetic tape reaches its beginning.

Figure 5:
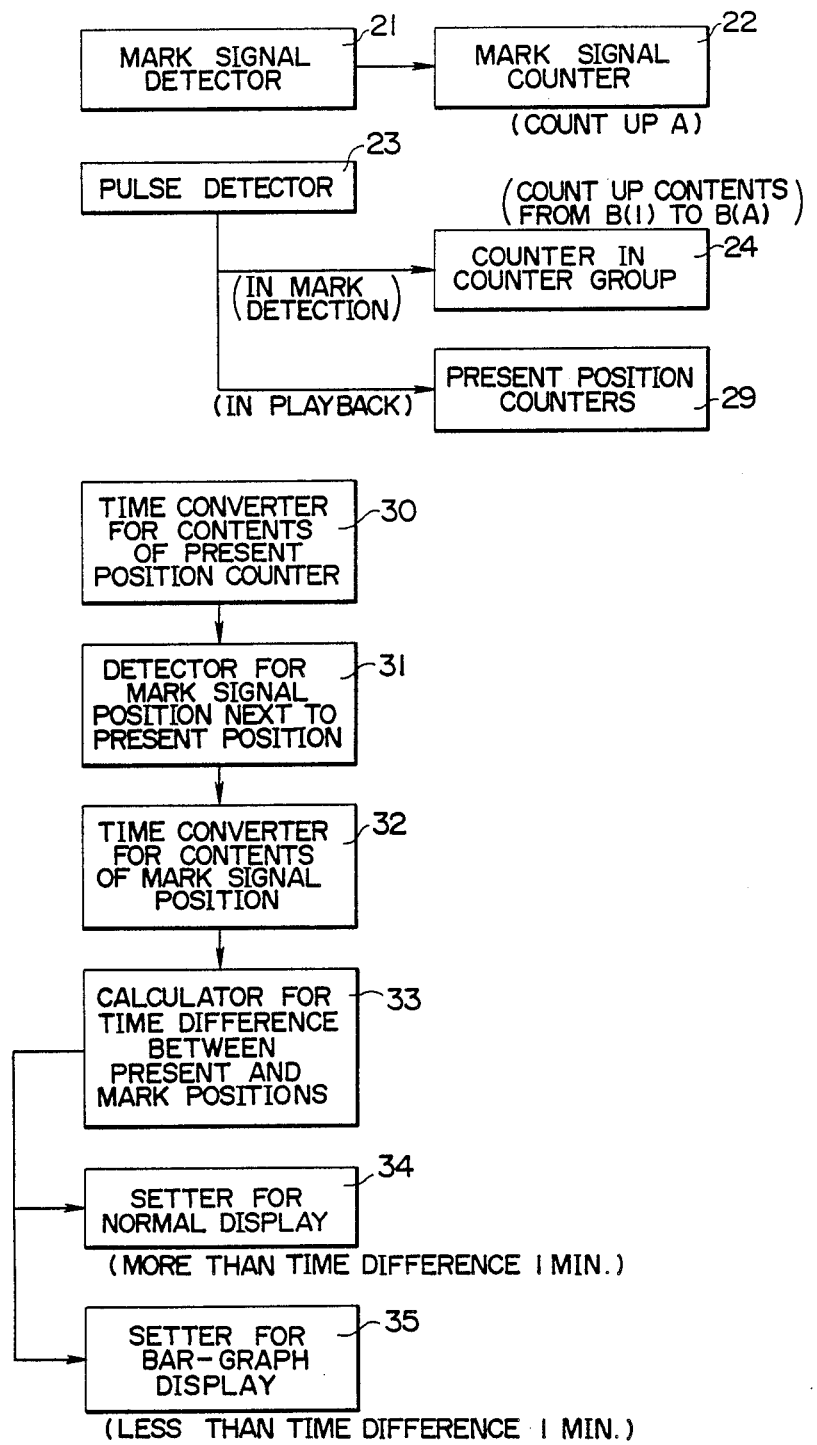
FIG. 5 is a functional block diagram showing a second embodiment of softwares in a display apparatus of the present invention.

In FIG. 5, which shows a second embodiment of software in a display apparatus of the present invention, a specific mark signal recorded on a magnetic tape is detected by a mark signal detecting means 21 and the number of mark signals is counted by a mark signal counting means 22. At this time, pulse signals produced by a shaft for driving a recording medium rotates are detected by a pulse detecting means 23. While specific mark signals recorded on the recording medium are detected the number of specific mark signals is counted by a counting means 24 in a group of counters. During the playback operation the number of pulses is counted by a present position counter means 29. Subsequently, contents in the present position counter means 29 are converted to time by a time converter means 30 for a present position and a position of the next mark signal to the present position is detected by a detector means 31 to be converted to time by a time converter means 32 for mark signals. The difference between times of the present position of the recording medium and the next mark signal position is calculated by a calculator means 33. When it is judged that the difference is more than a predetermined time period, display rows in which a plurality of display segments are arranged in correspondence with a predetermined time period are set to display in normal resolution by a display setter means 34. When it is judged that the difference is less than the predetermined time period, the display rows are set to bar-graph display by a bar-graph display setter means 35 so as to be in high resolution.

In the second embodiment, the CPU 16 (FIG. 1) processes pulse signals from the reel pulse detecting circuit 15 and cue mark signals from a mark signal detecting circuit 18 in accordance with a program which will be described later and the resulted data are stored in random access memory (RAM), not shown. The data are transferred between the RAM and a read-only-memory (ROM), not shown, and the position of a cue mark signal and the present position of a magnetic tape are displayed on the display row means 19, 20, respectively. When the difference in time between the present position and the position of the next cue mark signal to the present position is less than a predetermined time period, the display means 19, 20 are shifted from a normal display to a high resolution display.

The arrangement of the display row means 19, 20 are the same as in the first embodiment.

Figure 6:
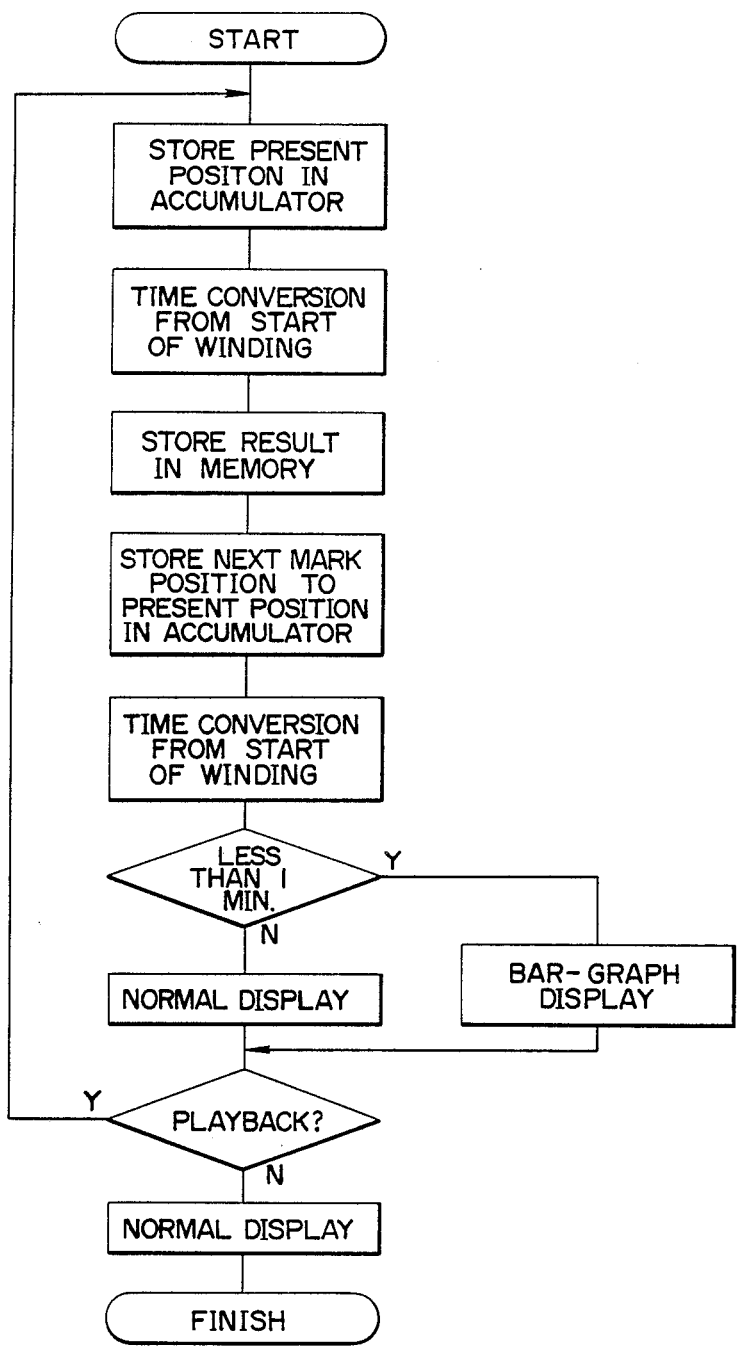
FIG. 6 is a flow chart showing operation of a microcomputer in the second embodiment.

Operation of the CPU 16 in the second embodiment will be described with reference to FIG. 6. The CPU 16 processes pulse signals delivered by the reel pulse detecting circuit 15 to record contents of the present position counter for a magnetic tape in an accumulator. The contents of the present position counter are converted to time starting from the magnetic winding and the result is stored in a memory. On the other hand, contents in a counter for the next cue mark signal position to the present position are stored in an accumulator and converted to time starting from the magnetic tape winding. When the difference in time between the present position and the next cue mark signal position to the present position is more than one minute, the display row means 19, 20 are set in the normal display and when the difference in time is less than one minute, the display of cue mark signals in the display row means 19, 20 is set to the bar-graph display of high resolution. Subsequently, if the device is in the playback condition, the above-mentioned operations are repeated, and if not, the display row means 19, 20 are set to the normal display to stop the operations.

Figure 7A:
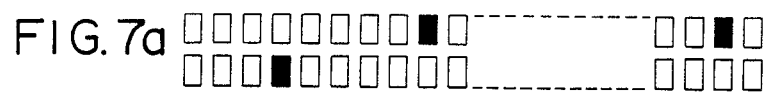
FIGS. 7a–7f are explanatory representations of display rows of the display apparatus in the second embodiment in operation.
Figure 7B:
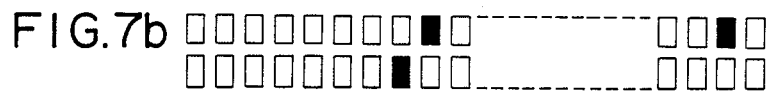
Figure 7C:
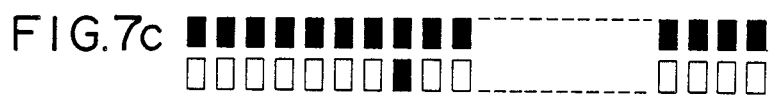
Figure 7D:
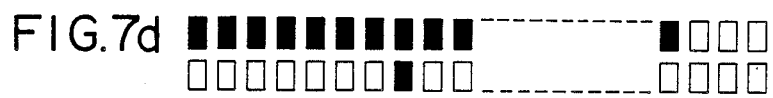
Figure 7E:
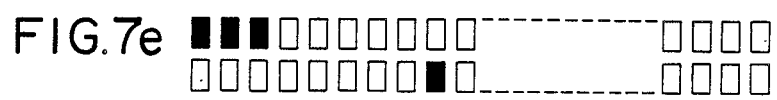
Figure 7F:
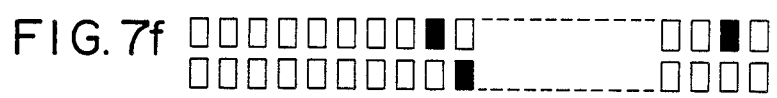

In the second embodiment, data from the reel pulse detecting circuit 15 and the mark signal detecting circuit 18 are processed by the CPU 16, and the cue mark position and the present position of a magnetic tape are displayed on the display rows 19, 20, respectively, as shown in FIGS. 7a to 7f. Assuming that one display segment represents one minute in order to explain intelligibly, in the case of FIG. 7a cue mark signals are recorded at a position of 9 to 10 minutes and at a position of 28 to 29 minutes and the magnetic tape is running at a position of 3 to 4 minutes from the actual start position of the tape. Then, the magnetic tape advances to a position of 7 to 8 minutes, as shown in FIG. 7b and when the difference in time between the present position of the magnetic tape and the position of a cue mark signal is one minute, the display row for cue mark signals in the display row means 19, 20 are all illuminated to be set to the bar-graph display, as shown in FIG. 7c. At this time, the entire bar-graph display represents one minute. The bar-graph is displayed disabling one or more of lights of the bar-graph so as to indicate the remaining time period, as shown in FIGS. 7d and e. When the present position of the tape passes the cue mark position, the display row for cue mark signals is reset to the normal display as shown in FIG. 7f.

With the foregoing arrangement, when the time difference between the present position of the magnetic tape and the next cue mark signal position to the present position is less than one minute, the remaining time period can be read in units of seconds, so that it is possible to accurately know the remainder in an oral statement.

Figure 8:
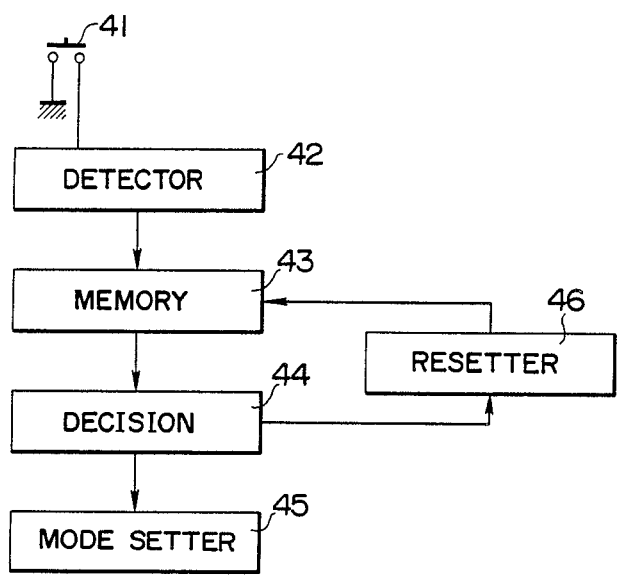
FIG. 8 is a functional block diagram showing an arrangement of a touch-type button for recording.

In a switching operation in mode a recording and playback device which employs an electronic touch-type button as a control, careless touching of such button may accidentally cause a change in mode of operation. A device for preventing such misoperation without impairing the sensitivity and speed of such type of button will be explained with reference to FIG. 8.

When a touch-type button 41 of a recording and playback device is operated, such information is detected by a detector means 42 and stored in a storing means 43. The information is fed to a judging means 44 which triggers a mode setter 45 to set a desired mode when it is determined that the button 41 has been continuously operated for a given time. When judging means 44 that determines the button 41 has not been continuously operated for a given time, the contents stored in the storing means 43 are erased by a reset means 46. As such, a desired mode is not set until the button 41 is is continuously operated for a given time.

Figure 9:
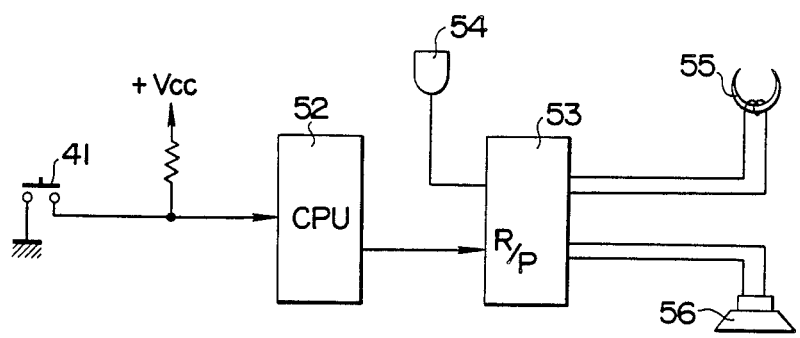
FIG. 9 is a schematic diagram showing a structure of the touch-type button shown in FIG. 8.

FIG. 9 shows an example of the foregoing device which is applied to a tape recorder. In FIG. 9, a touch-type button 41 for selecting various modes is for use in recording. When the button 41 is depressed, an electric signal is produced. The electric signal is fed to a central processing unit (CPU) 52 of a microcomputer in which the signal is processed in accordance with a program which will be described later.

The CPU 52 allows a storing means, such as a random access memory (RAM), not shown, to store the information that the button 41 has been depressed in response to an electrical signal from the button 41. The information contents are transferred between the RAM and a read-only-memory (ROM), not shown. At this time, when the CPU 52 determines by a program written in the ROM that the button 41 has been continuously operated for a given time, the CPU 52 produces a recording mode setting signal and when the CPU 52 determines that the button 41 has not been continuously operated for a given time, the CPU 52 resets the contents stored in the RAM.

An analog IC 53 is switched by a recording mode setting signal of the CPU 52 to the recording mode. With the recording mode thus switched, information from a microphone 54 is recorded through a magnetic head 55 on a magnetic recording medium.

In touch-type buttons for various modes of playback, stop, rewinding, quick transporting, or the like the present switch verification structure may be employed. These buttons may be controlled by the CPU 52 to set corresponding modes when they are continuously operated for a given time. When a playback mode is set, information recorded on a magnetic recording medium is read by a magnetic head 55 and then is reproduced, through the analog IC 53, on a speaker 56 as sound.

Figure 10A:
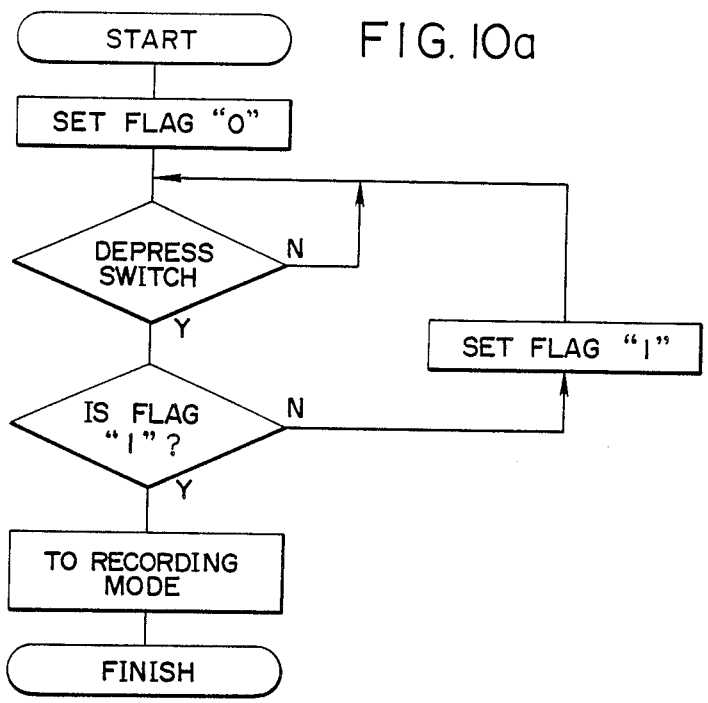
FIGS. 10a-10b are flow charts showing operations of a microcomputer of the touch-type button.

Operations of the foregoing device will be explained with reference to FIGS. 10a and b. When a power source of a tape recorder is turned on, a flag of the CPU 52 turns "0". When the CPU 52 determines whether a touch-type button 41 for recording is operated with such condition, for example, as the button 41 is operated for the first time a flag is set to "1". When the button 41 is successively operated, the CPU 52 determines that the button 41 is twice operated successively and delivers a recording mode setting signal to the analog IC 53 to proceed to the recording mode.

Figure 10B:
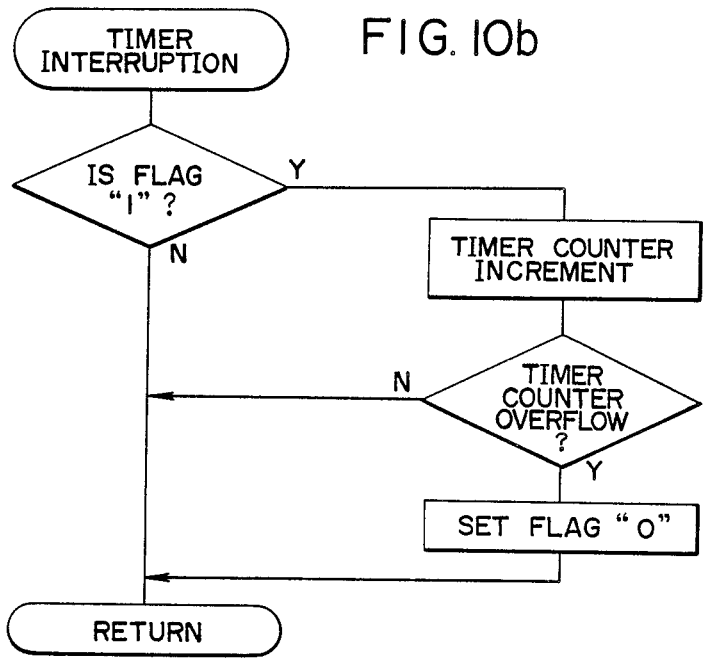

When a given time elapses by a timer interruption routine shown in FIG. 10b, however, the flag is reset to "0". When the button 41 is initially depressed to set the flag to "1", the timer interruption routine operates a timer.

With such structure, unless an operator continuously and intentionally operates the button 41 for a desired mode for a given time, the device is not shifted to the desired mode, so that there is little possibility that the button 41 is twice operated within a given time even if being carelessly touched. Thus, it is possible to prevent such misoperation due to erroneous touching. In addition, the button 41 for a desired mode (FIG. 9) is operable by continuously depressing for a given short time, so that it is possible to quickly set a desired mode and to rapidly start recording information when desired, with easy operation of the button.

Figure 11:
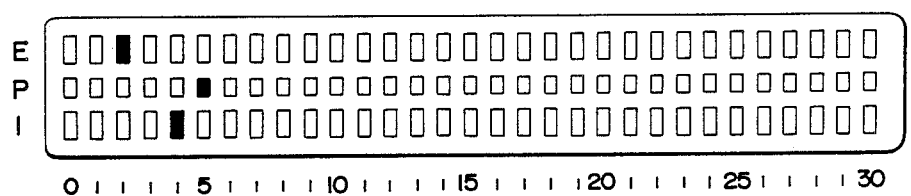
FIG. 11 is an explanatory representation of display rows of a further display apparatus that can be used in the invention.

In the foregoing description, two display rows are shown as an aspect of the display but it is to be understood that the display of the present invention is not limited thereto and the display may be as shown, for example, in FIG. 11. The display has three rows: E, an end mark position display row which indicates the end of (each item (e.g., letter); P, a tape present position display row which indicates a present position of a tape as it is running; and I, an instruction mark position display row which indicates instructions to oral statements, order of typing and the like.

In the three display rows, E, P and I, respective segments constituting the rows are varied in size and color in order to facilitate identification for display. By way of example, the P display row is disposed in the center and is in green, and the I and E display rows are respectively disposed the upper and lower sides of the P display row and their segments are larger than that of the P display row in size and are in red. Thus, it is possible to avoid misreading of signals in the arrangement of two kind displays such as the I and E display rows for specific mark positions and the P display row for the present position by changing their sizes and colors.

What is claimed is:

1. A display apparatus for a recording and/or playback device, comprising:
   pulse generator means for generating pulses in response to the rotation of a reel to which one end of a recording tape is fixed;
   mark signal detector means for detecting a plurality of mark signals recorded on said recording tape;
   a plurality of counter means corresponding respectively to said plurality of mark signals, each of said counter means for counting said pulses for a length of time determined by the positions of its respective mark signal;
   display row means in which a plurality of display elements are arranged in at least one row, each of said display elements indicating a predetermined time interval;
   means for displaying on said display row means the present position of said tape as the tape is moved past a tape head;
   converter means for converting counts stored in said counter means to time intervals, said conversion being carried out each time a new mark signal is detected as a function of the relative position of the most recently and previously detected mark signals; and
   means for displaying on said display row means the position of said mark signals recorded on said tape as a function of said converted time intervals.

2. A display apparatus according to claim 1, in which said display row means is arranged in a plurality of rows, and in which the present position of the tape and the position of a mark signal are separately displayed in respective rows.

3. A display apparatus according to claim 1, in which said specific mark signals are reference marks indicating the start position and end position of an oral statement and instructions to an oral statement.

4. A display apparatus for a recording and/or playback device, comprising:
- (A) means for generating pulses in response to the rotation of either a supply or a winding reel to which one end of a recording tape is fixed;
- (B) mark signal detector means for detecting a plurality of mark signals recorded on said recording tape;
- (C) mark signal display means in which a plurality of display elements are arranged in a row, each said display element indicating a predetermined time intervals, said mark signal display means being operable in:
  - (1) a low resolution mode wherein said predetermined time interval is a first time interval and said mark signal display means displays the time interval between each of said cue mark signals; and
  - (2) a high resolution mode wherein said predetermined time interval is a second time interval, smaller than said first time interval, and said mark signal display means displays the time interval between the present position of said tape and the next cue mark signal as measured in the running direction of the tape; and
- means for operating said mark signal display means in said low resolution and said high resolution modes, respectively, when the time between the present position of the tape and the position of the next mark signal in the running direction of the tape is more than and less than a preset time, respectively.

5. A display apparatus according to claim 4, further including tape position display means in which a second plurality of display elements are arranged in a row, each of said second display elements indicating a predetermined time interval, said second display means indicating the present position of the tape.

6. A display apparatus according to claim 4, in which said mark signals are reference marks made by an operator of the device.

7. A display apparatus according to claim 4, wherein said second time interval is much smaller than said first time interval.

8. A display apparatus according to claim 4, wherein said preset time is equal in length to said first time interval.

9. A display apparatus according to claim 5, wherein the respective display elements of the two said display means are located adjacent one another and each indicate the same predetermined time interval when said mark signal display means is operated in said low resolution mode.

10. A display apparatus according to claim 2, wherein said display elements of said mark signal display means are arranged in a middle row, and said display elements of said tape position display means are located in two rows, one located above and one located below said middle row.

11. A display apparatus according to claim 10, wherein the present position of said tape and said positions of said mark signals are displayed in different colors.

12. A display apparatus for a recording and/or playback device, comprising:
- pulse generator means for generating pulses in response to the rotation of a reel to which one end of a recording tape is fixed;
- mark signal detector means for detecting the positions of mark signals recorded on said tape;
- display row means comprising upper, lower and middle rows of display elements, each display element indicating a predetermined time interval;
- means for displaying the present position of said tape on said middle row; and
- means for displaying said positions of said mark signals on said upper and lower rows.

13. A display apparatus according to claim 12, wherein said present position of said tape and said positions of said mark signals are displayed in different colors.

* * * * *